(12) United States Patent
Haack

(10) Patent No.: US 10,136,655 B2
(45) Date of Patent: Nov. 27, 2018

(54) SAW BLADE ILLUMINATING SAFETY DEVICE

(71) Applicant: William M Haack, Venice, FL (US)

(72) Inventor: William M Haack, Venice, FL (US)

( * ) Notice: Subject to any disclaimer, the term of this patent is extended or adjusted under 35 U.S.C. 154(b) by 17 days.

(21) Appl. No.: 15/451,611

(22) Filed: Mar. 7, 2017

(65) Prior Publication Data

US 2018/0104753 A1  Apr. 19, 2018

Related U.S. Application Data

(60) Provisional application No. 62/410,118, filed on Oct. 19, 2016.

(51) Int. Cl.
| | |
|---|---|
| *B23D 59/00* | (2006.01) |
| *A22B 5/20* | (2006.01) |
| *B23D 55/00* | (2006.01) |
| *B27G 19/06* | (2006.01) |
| *A22C 17/00* | (2006.01) |
| *F21V 33/00* | (2006.01) |

(52) U.S. Cl.
CPC .......... *A22B 5/208* (2013.01); *A22C 17/0006* (2013.01); *B23D 55/00* (2013.01); *B27G 19/06* (2013.01); *F21V 33/00* (2013.01)

(58) Field of Classification Search
None
See application file for complete search history.

(56) References Cited

U.S. PATENT DOCUMENTS

| | | | | |
|---|---|---|---|---|
| 5,461,790 | A * | 10/1995 | Olstowski | B23D 59/003 30/390 |
| 5,996,460 | A * | 12/1999 | Waite | B23D 33/12 30/123 |
| 2001/0049988 | A1* | 12/2001 | Ushiwata | B23D 59/003 83/520 |
| 2003/0047050 | A1* | 3/2003 | Onose | B23D 59/003 83/469 |
| 2004/0049927 | A1* | 3/2004 | Wu | B23D 59/003 30/391 |
| 2004/0163522 | A1* | 8/2004 | Huang | B23D 59/003 83/520 |
| 2005/0195592 | A1* | 9/2005 | Hsu | B23D 59/003 362/120 |
| 2007/0107235 | A1* | 5/2007 | Mok | B23D 59/003 30/264 |
| 2007/0193039 | A1* | 8/2007 | Onose | B23D 45/16 30/388 |
| 2009/0025233 | A1* | 1/2009 | Kaiser | B23D 49/167 30/392 |

(Continued)

*Primary Examiner* — Elmito Breval
(74) *Attorney, Agent, or Firm* — Jason T. Daniel, Esq.; Daniel Law Offices, P.A.

(57) ABSTRACT

A saw blade illumination device includes a waterproof main body that houses a light source to be directed along the length of a bandsaw blade. The device includes a mounting bracket for securing the main body onto a guide post of the band saw. The light source includes a laser assembly having a laser diode, and a lens for producing a generally planar beam of light. A vibration isolator is disposed along the mounting bracket at a location between the main body and the guide post. A power unit is connected to the light source and includes a step down transformer and an electrical connector for engaging the power source of the band saw.

13 Claims, 4 Drawing Sheets

(56) References Cited

U.S. PATENT DOCUMENTS

| | | | |
|---|---|---|---|
| 2009/0077816 A1* | 3/2009 | Gibbons | B23D 51/025 30/392 |
| 2009/0077817 A1* | 3/2009 | Gibbons | B23D 49/162 30/392 |
| 2009/0241748 A1* | 10/2009 | Keller | B27G 19/02 83/522.13 |
| 2010/0000094 A1* | 1/2010 | Lombardo | B23D 59/00 30/123 |
| 2010/0325903 A1* | 12/2010 | Patel | B23D 45/122 30/377 |
| 2012/0005906 A1* | 1/2012 | Koeder | B23D 59/003 30/392 |
| 2012/0097004 A1* | 4/2012 | Marinov | G02B 7/1825 83/471.2 |
| 2013/0062087 A1* | 3/2013 | Koeder | B23D 49/167 173/2 |
| 2013/0277081 A1* | 10/2013 | Hayashi | B23Q 15/00 173/217 |

* cited by examiner

SAW BLADE ILLUMINATING SAFETY DEVICE

CROSS-REFERENCE TO RELATED APPLICATIONS

This application claims the benefit of U.S. Application Ser. No. 62/410,118 filed on Oct. 19, 2016, the contents of which are incorporated herein by reference.

TECHNICAL FIELD

The present invention relates generally to safety devices, and more particularly to a device for providing a clear visual warning of an operable cutting blade.

BACKGROUND

The statements in this section merely provide background information related to the present disclosure and may not constitute prior art.

Virtually every major grocery store and butcher shop has one or more industrial grade cutting saws for butchering and quartering large animals such as cows and hogs. These meat and bone saws are typically specially constructed band saws having a plurality of access ports through which the components can be thoroughly rinsed and cleaned before/after usage.

As will be known to those of skill in the art, band saws include two spaced-apart wheels, a blade tightly looped around the wheels, a motor for actuating the wheels, and a cutting table. The blade is made from a band of metal with teeth on one edge of the band. During operation, the blade moves around the spinning wheels and cuts meat that is fed along the cutting table.

Owing to the irregular shape and size of meat that is cut by such saws, previous attempts to provide a functional blade guard/cover for use during device operation have been met with minimal success. As such, a significant portion of the blade located above the cutting table remains exposed to the operator when using the saw. This arrangement has resulted in several deaths, and a countless number of serious injuries to workers, making operation of these saws one of the most dangerous jobs in the grocery industry.

When questioned about such injuries, workers often state that they were not able to see the moving saw blade when they were cutting the meat, as the gray color of the blade blends with the gray color of the machine. Additionally, as the meat is manually fed to the saw blade, the workers attention is typically focused on the piece of meat itself, and do not have a visual reference as to the proximity of their hands to the moving saw blade.

Accordingly, it would be beneficial to provide a safety device for new and existing saws that can illuminate the spinning blade, so as to provide a visual indication to workers of where the blade is at all times, therefore reducing the number of instances described above.

SUMMARY OF THE INVENTION

The present invention is directed to a saw blade illumination safety device. One embodiment of the present invention can include a waterproof main body for housing a light source to be directed along the length of a bandsaw blade. A mounting bracket is selectively engaged onto the main body and is designed to secure the device onto a guide post of the band saw.

In one embodiment, the light source includes a laser assembly having a laser diode, and a lens for producing a generally planar beam of light. The illumination device can also include a power unit having a step down transformer and an electrical connector for engaging the power source of the band saw.

In yet another embodiment, the illumination device can include a vibration isolator that is disposed along the mounting bracket and can function to prevent the vibrations emanating from the saw 5 from disturbing the visual output of the light source.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
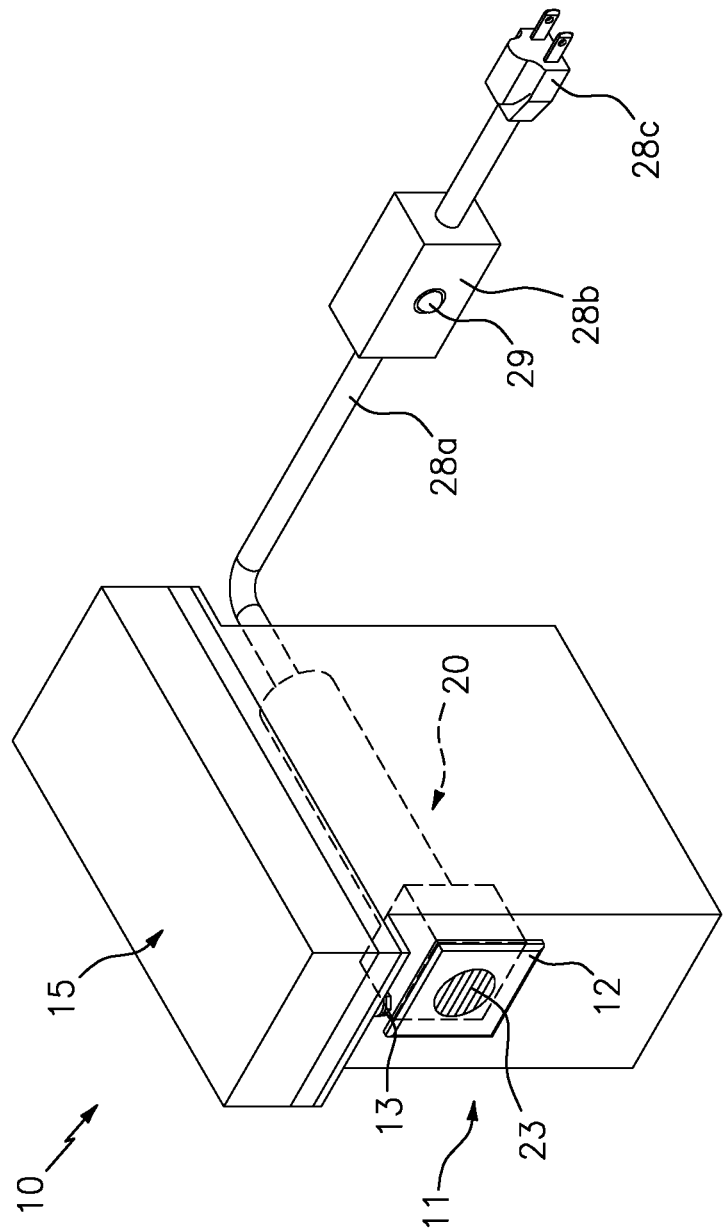
FIG. 1 is a front perspective view of the saw blade illumination safety device that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described throughout this document, the term "complementary shape," and "complementary dimension," shall be used to describe a shape and size of a component that is identical to, or substantially identical to the shape and size of another identified component.

As described herein, the term "removably secured" and derivatives thereof shall be used to describe a situation wherein two or more objects are joined together in a non-permanent manner so as to allow the same objects to be repeatedly joined and separated. This can be accomplished through the use of any number of commercially available connectors such as opposing strips of hook and loop material (i.e. Velcro®), magnetic elements, and compression fittings such as hooks, snaps and buttons, for example. Moreover, the term "permanently secured" shall be used to describe a situation wherein two or more objects are joined together in a manner so as to prevent the same objects from being separated. This can be accomplished through the use of permanent connectors, including glue or resin, hardware such as nuts and bolts, and welds, for example.

FIGS. 1-4 illustrate one embodiment of a saw blade illumination safety device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

Figure 2:
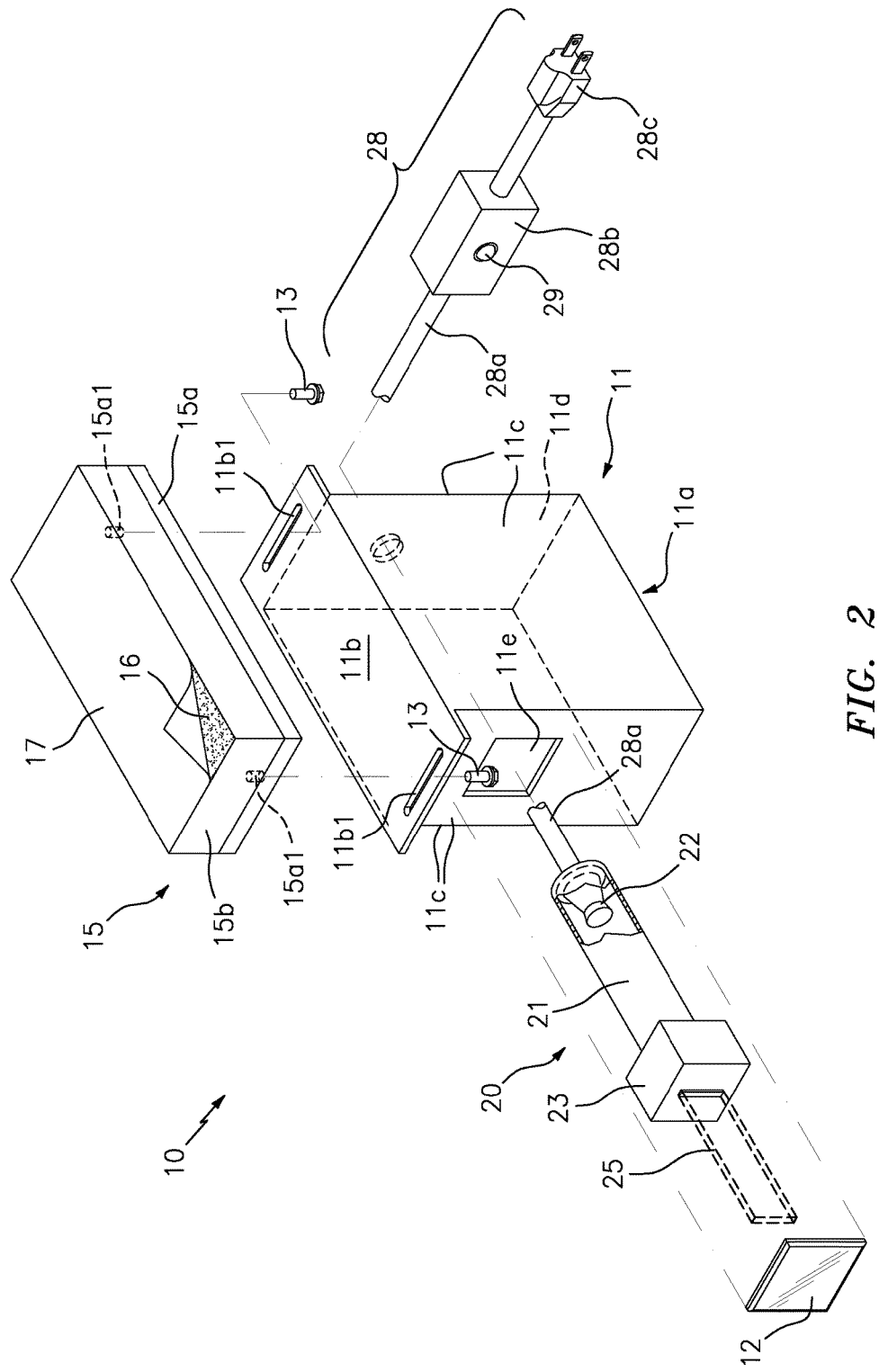
FIG. 2 is an exploded parts view of the saw blade illumination safety device, in accordance with one embodiment of the invention.

As shown best in FIGS. 1 and 2, the illumination safety device 10 can include, essentially, a main body 11, a mounting bracket 15, a light source 20, and a power supply unit 28.

The main body 11 can provide a protective watertight enclosure for the below described light source 20. In the preferred embodiment, the main body can be constructed from strong rigid plastic, and can include a generally rectangular shaped member having a bottom end 11a, a top end 11b and a plurality of upstanding walls 11c that define a generally hollow interior space 11d.

As shown, one of the side walls can include an opening 11e having a shape and size that is suitable for receiving the below described lens 23. To this end, a protective transparent cover 12 can extend along the opening. As described herein, the cover can be constructed from any number of sturdy transparent materials such as acrylic, for example, and can function to allow laser light to pass therethrough while maintaining a watertight interior space. Moreover, the top end 11b can include a pair of alignment channels 11b1 along the ends thereof.

Although described above with regard to a particular shape and construction material, this is for illustrative purposes only. As such, the main body can be constructed from any number of materials that are, for example, relatively strong and stiff for their weight. For example, the main body may be formed from a metal or metal alloy (e.g., aluminum, steel, titanium, or alloys thereof), a polymer (e.g., high-density polyethylene (HDPE) or polyethylene terephthalate (PET)), or a composite material (e.g., carbon fibers in a polymer matrix, fiberglass, etc.). Likewise, the main body can include any number of different shapes suitable for performing the below described functionality.

Figure 4:
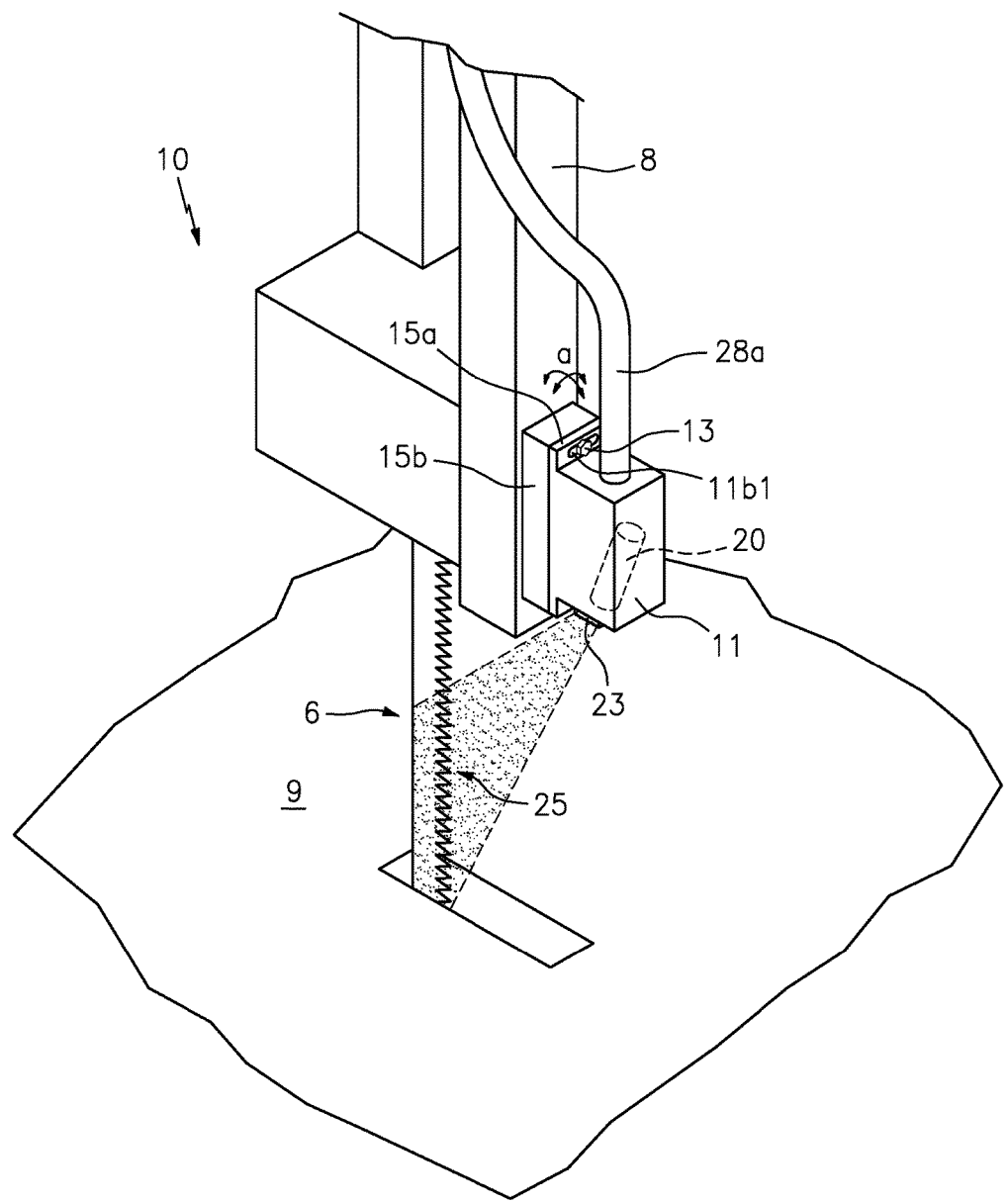
FIG. 4 is a cutout view of the device as shown in FIG. 3.

The mounting bracket 15 can include a generally rigid lower portion 15a having a shape and size that is complementary to the top end 11b of the main body. The lower portion can be constructed from the same or different materials described above with regard to the main body, and can also include a threaded hole 15a1 along each end. The lower portion can be secured onto the main body via the illustrated screws 13 which can pass through the alignment channels 11b1 before engaging holes 15a1. As shown in FIG. 4, such a feature allows a user to manually align and direct the output of the light source along the length of the saw blade. Of course, any number of other devices can be provided in order to allow a user to removably secure the main body onto the mounting bracket and/or to adjust the orientation of the main body relative to the saw.

In one embodiment, the bracket 15 can also include a vibration isolator in the form of an elastomeric pad 15b, for example, which can be permanently secured along one side of the rigid portion 15a. As will be known to those of skill in the art, vibration isolators function to dampen the veracity and amplitude of vibrations passing therethrough. In the present case, the isolator 15b can function to reduce or eliminate vibrations emanating from the saw 5 so as to ensure the visual output of the light source 20 remains fixedly directed along the length of the saw blade. Of course, any number of other types of vibration isolators such as spring mounts, for example, can also be utilized herein.

In one embodiment, the mounting bracket 15 can be secured onto the saw 5 in a peel-and-stick manner. As such, an adhesive 16 such as glue or resin, for example, having a removable covering layer 17 can be provided along an upper portion of the mounting bracket. Of course, the mounting bracket is not limited to the use of an adhesive for engaging the saw, as any number of other connectors can be utilized alone, or in conjunction with the vibration isolator to secure the main body onto a saw in either a permanent or removable manner.

The light source can preferably comprise a laser assembly that includes a substantially cylindrical barrel 21, having a laser diode 22 disposed therein, and a line lens 23 along one end. The assembly 20 can be secured within the interior space of the main body 11d, so as to position the lens 23 in line with the opening 11e and the protective cover 12. Although not specifically illustrated, persons skilled in the art will recognize that a collimating lens may also be disposed between the laser diode 22 and the line lens 23. In either instance, the line lens 23 converts the laser beam exiting the laser diode 22 into a planar beam 25 that is emitted through the clear cover 12.

In the preferred embodiment, the laser assembly can include a 5 mW line laser diode producing a red line at 650 nm. Of course, any number of other light sources and/or light producing devices and components can also be utilized herein. Several nonlimiting examples include various light emitting diodes (LED), and/or focused electric light bulb based systems. Although not illustrated, any number of light deflecting devices, such as a mirror, for example, can also be provided to adjust the orientation of the light.

In either instance, the laser assembly can be connected to a power supply unit 28 which can include one or more of a power supply line 28a, an AC to DC transformer 28b and supply plug 28c. In various embodiments, an electrical switch 29 can be provided along one of the main body 11 or the power supply unit, in order to control the operation of the laser assembly. Of course, the power supply unit can also include or comprise a battery unit for providing power to the laser assembly as well.

Figure 3:
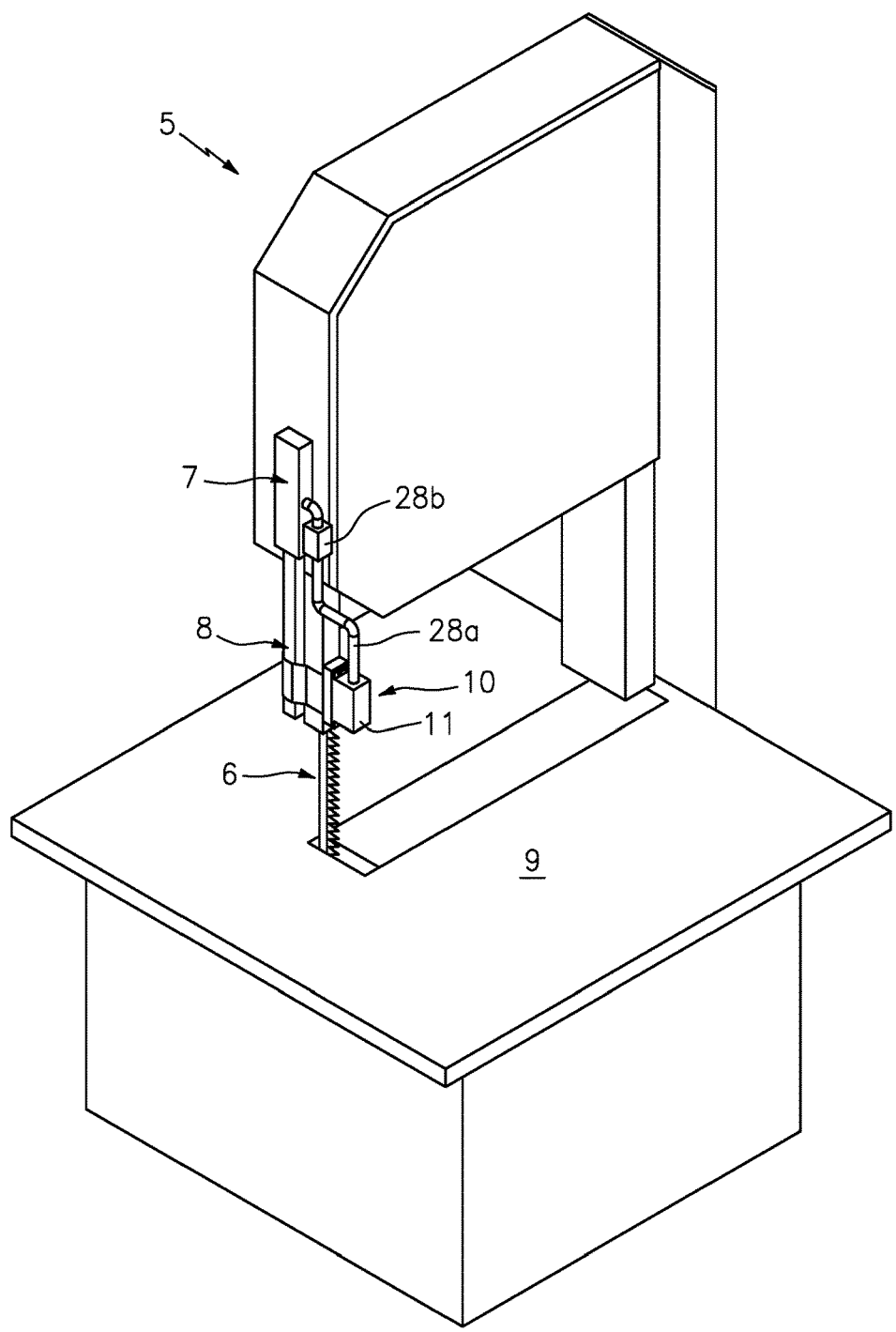
FIG. 3 is a perspective view of the saw blade illumination safety device in operation with a band saw, in accordance with one embodiment of the invention.

FIG. 3 illustrates one embodiment of the illumination safety device 10 in operation. As shown, the device can be secured onto a conventional meat and bone saw 5 at a location adjacent to the saw blade 6. When so positioned, the power supply can be connected to the power unit 7 of the saw, so as to receive electrical power only when the saw is being operated. In such an embodiment, the laser assembly can be configured in an always-on mode, that will operate the assembly whenever power is supplied from the transformer 28b.

As shown best in cutout FIG. 4, the device will preferably be secured along the guide post 8, so as to direct the beam 25 onto the entire portion of the saw blade 6 located between the post and the cutting table 9. To compensate for the device being slightly axially offset from the saw blade 6, a user can adjust the orientation of the laser output 25 using the above described alignment channels 11b1 and screws 13 (see arrow a).

Although illustrated above as being located along the outside of an existing bone saw, other embodiments are contemplated. To this end, the inventive concepts disclosed herein can be manufactured into the design and new construction of any type of saw, so as position the components behind the saw body housing. Such an arrangement is well within the ability of those of skill in the art without undue experimentation. In either instance, the above described safety illumination device provides workers with a clear visual indication of the location of the saw blade at all times.

In addition to the above, other embodiments are also contemplated wherein the device can include a motion sensor that is capable of independently detecting movement of the saw blade. In such an embodiment, the light source can be automatically activated and power can be supplied thereto via a battery power source. Such a feature allowing redundancy in the operation of the device in the event the connection between the device and the saw power source is severed.

As described herein, one or more elements of the safety illumination device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. An illumination safety device for a saw having a guide post, a cutting table and a saw blade, said safety device comprising:
    a main body having a plurality of walls defining a waterproof hollow interior space;
    a mounting bracket that is configured to secure the main body onto the guide post of a saw;
    a light source that is positioned within the main body;
    a power unit that is in communication with each of the light source and the saw; and
    a pair of alignment channels that are disposed along a top end of the main body, said alignment channels being in communication with the mounting bracket and functioning to adjust an angle of the light source to emit a narrow beam of light along an entirety of a portion of the saw blade that is located between the guide post and the cutting table.

2. The device of claim 1, wherein the mounting bracket includes:
    a generally rigid lower portion having a shape and size that is complementary to a top end of the main body;
    a pair of threaded holes that are disposed along the rigid lower portion, said threaded holes including a location that is complementary to a location of the pair of alignment channels; and
    a pair of screws for selectively engaging each of the alignment channels and the pair of threaded holes.

3. The device of claim 2, further comprising:
    an adhesive material that is disposed along an upper portion of the mounting bracket.

4. The device of claim 1, wherein the light source includes a laser assembly.

5. The device of claim 4, wherein the laser assembly comprises:
    a laser diode for generating a laser beam;
    a cylindrical channel for housing the laser diode; and
    a line lens for converting the generated laser beam into a planar beam of light.

6. The device of claim 5, wherein the planar beam of light comprises:
    a red line at 650 nm.

7. The device of claim 5, further comprising:
    an opening that is disposed along one of the plurality of walls of the main body; and
    a transparent cover that is disposed along an entirety of the opening,
    wherein said opening and lens are aligned with the line lens and configured to allow the planar beam of light to pass therethrough.

8. The illumination safety device of claim 1, wherein the power unit includes functionality for providing power to the light source only during an operation of the saw.

9. The illumination safety device of claim 8, further comprising:
    an alternating current to direct current transformer that is interposed between the light source and the saw.

10. The illumination safety device of claim 1, further comprising:
    a vibration isolator that is interposed between the main body and the saw.

11. The illumination safety device of claim 10, wherein the vibration isolator is permanently secured along one side of the mounting bracket.

12. The illumination safety device of claim 10, wherein the vibration isolator comprises:
   an elastomeric pad that is permanently secured along one side of the mounting bracket.

13. The illumination safety device of claim 10, wherein the vibration isolator consists of:
   an elastomeric pad that is permanently secured along one side of the mounting bracket.

* * * * *